(12) United States Patent
Boroumand et al.

(10) Patent No.: US 10,748,100 B1
(45) Date of Patent: Aug. 18, 2020

(54) METHOD AND APPARATUS FOR ENTERPRISE INVESTMENT DELIVERY AND VALUE ASSURANCE

(71) Applicants: Mohamad Boroumand, San Rafael, CA (US); Charlene April Boroumand, San Rafael, CA (US)

(72) Inventors: Mohamad Boroumand, San Rafael, CA (US); Charlene April Boroumand, San Rafael, CA (US)

(*) Notice: Subject to any disclaimer, the term of this patent is extended or adjusted under 35 U.S.C. 154(b) by 271 days.

(21) Appl. No.: 15/884,099

(22) Filed: Jan. 30, 2018

Related U.S. Application Data

(63) Continuation of application No. 10/761,050, filed on Jan. 15, 2004, now abandoned.

(60) Provisional application No. 60/441,196, filed on Jan. 21, 2003.

(51) Int. Cl.
*G06Q 10/06* (2012.01)

(52) U.S. Cl.
CPC ....... *G06Q 10/0635* (2013.01); *G06Q 10/067* (2013.01); *G06Q 10/06393* (2013.01)

(58) Field of Classification Search
CPC .............. G06Q 10/06; G06Q 10/0635
USPC ........................................ 705/7.23
See application file for complete search history.

(56) References Cited

U.S. PATENT DOCUMENTS

| | | | | |
|---|---|---|---|---|
| 6,842,760 B1* | 1/2005 | Dorgan | | G06Q 10/06 700/100 |
| 7,305,392 B1* | 12/2007 | Abrams | | G06Q 10/06 707/770 |
| 7,318,038 B2* | 1/2008 | Labbi | | G06Q 10/06313 705/7.23 |
| 7,756,732 B2* | 7/2010 | McLean | | G06Q 10/0637 705/7.37 |
| 2002/0128895 A1* | 9/2002 | Broderick | | G06Q 10/06316 705/7.14 |
| 2002/0198755 A1* | 12/2002 | Birkner | | G06Q 10/06 705/7.23 |
| 2003/0004763 A1* | 1/2003 | LaBlanc | | G06Q 10/0635 705/7.28 |
| 2003/0023597 A1* | 1/2003 | Ha | | G06Q 10/10 |
| 2003/0023677 A1* | 1/2003 | Morison Zuill | | G06Q 10/10 709/203 |
| 2003/0036942 A1* | 2/2003 | Wescott | | G06Q 10/06313 705/7.23 |

(Continued)

OTHER PUBLICATIONS

"The role of project management in achieving project success," by A K Munns and B F Bjeirmi. University of Dundee, Department of Civil Engineering, Dundee, Scotland. International Journal of Project Management, vol. 14, No. 2, pp. 81-87. Published: 1996. (Year: 1996).*

*Primary Examiner* — Sara C Hamilton
(74) *Attorney, Agent, or Firm* — Dergosits & Noah LLP

(57) ABSTRACT

A method and apparatus for assuring delivery and value from a wide array of investments in processes, people, technologies, and tools including modeling project types and risk profiles, managing and conducting processes for assuring delivery and value, modeling and optimizing project teams, managing all associated information through computerized means, and rendering widely accessible analytic views representing interactive graphical representations. This invention covers entire life cycles of investments whose outcomes are achieved through projects, from initial inception to retirement or termination.

12 Claims, 5 Drawing Sheets

(56) References Cited

U.S. PATENT DOCUMENTS

Figure 1:
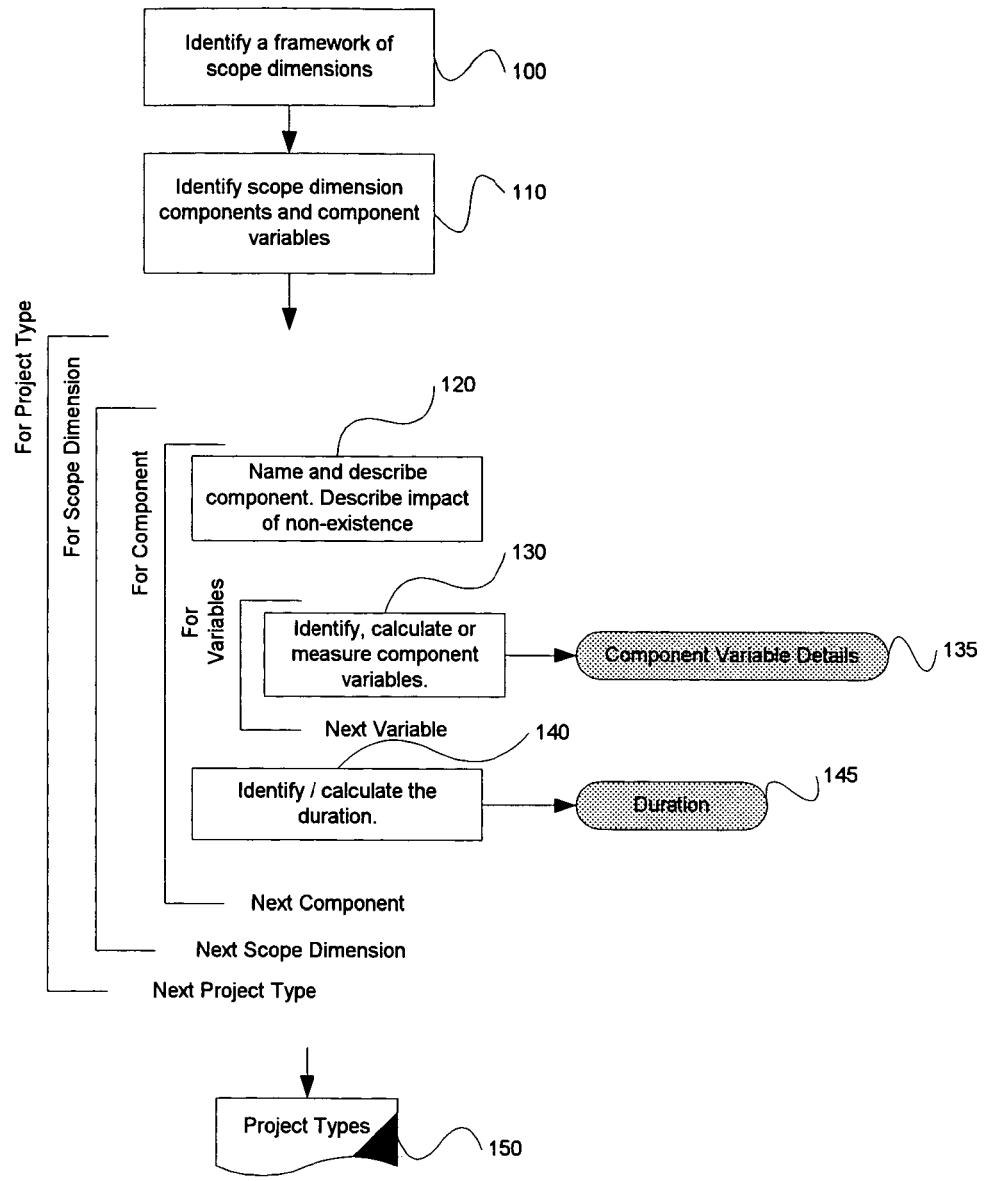

| | | | | |
|---|---|---|---|---|
| 2003/0093472 A1* | 5/2003 | Warren | ................. | G06F 16/972 709/203 |
| 2003/0135399 A1* | 7/2003 | Ahamparam | ...... | G06Q 10/0635 705/7.28 |
| 2004/0054562 A1* | 3/2004 | Tanaka | ........... | G06Q 10/063114 705/7.15 |
| 2004/0068517 A1* | 4/2004 | Scott | ..................... | G06Q 10/10 |

* cited by examiner

METHOD AND APPARATUS FOR ENTERPRISE INVESTMENT DELIVERY AND VALUE ASSURANCE

CROSS-REFERENCE TO RELATED APPLICATIONS

The present application is a continuation of U.S. patent application Ser. No. 10/761,050, entitled "METHOD AND APPARATUS FOR ENTERPRISE INVESTMENT DELIVERY AND VALUE ASSURANCE," filed on Jan. 15, 2004, which claims priority to and the benefit of U.S. Provisional Application No. 60/441,196, entitled "ENTERPRISE PORTFOLIO MANAGEMENT, A SYSTEM AND METHOD FOR ASSURING ENTERPRISE INVESTMENT VALUE AND DELIVERY THROUGH RISK MINIMIZATION, RELATIONSHIP OPTIMIZATION AND RETURNS MAXIMAZATION," filed on Jan. 21, 2003, which are all incorporated by reference in their entirety.

FEDERALLY SPONSORED RESEARCH

Not Applicable

SEQUENCE LISTING OR PROGRAM

Please see the enclosed CDs (duplicate copies—Copy I and II), for complete software object code, associated link libraries, and installation guide.

BACKGROUND OF THE INVENTION

Field of Invention

The present invention relates generally to systems and methods for proactively, predictively, and objectively assuring delivery of, and value from, a wide array of investments an enterprise or organization makes in its people, processes, technologies, and tools. More specifically, the present invention relates to systems and methods for holistically and progressively tracking and reducing the probability of failure to deliver investments in projects on time, on budget and with all required capabilities, and tracking and increasing confidence in the likelihood of achieving measurable value from investments in projects with impacts on objectives and/or tangible financial benefits.

Discussion of Prior Art

Many companies today sell various methods and tools designed for businesses to facilitate their traditional mainstay of project and program management. Many of these companies have begun to evolve their product offering(s) into multi-project management tools. This is usually accomplished by adding features associated with current or proposed projects that a) reflect highly subjective or chronically belated value or risk assessments (e.g., "red/yellow/green" annotations about relative importance or expected benefit from projects) or, b) that depend on superficial, frequently-changing, or unconfirmed data e.g., total cost or total staff. Projects are still failing at unacceptably high rates.

Because of the strong anchoring effects of existing products and methods for singular project management and well-established sales approaches that favor leveraging existing clients already owning earlier version of the products, prior art has generally focused on collecting and reporting aggregations and summaries of a multitude of granular project data while adding little real, actionable new insights or information. Unfortunately, most such projects and their data, while perhaps being similarly named, are not standardized prior to their aggregation and are therefore fundamentally incomparable across these individually conceived and managed projects.

Many of these product companies have adopted variations of the moniker "project portfolio management," to characterize such incremental and aggregate rollup capabilities and to lend a sense of legitimacy. In addition to the aforementioned disadvantages of the prior art, the three key success factors for these solutions are regularly ensuring compliance, timeliness, and stark truthfulness from a vast multitude of users across the enterprise in order to obtain even minimally useful results.

These requirements impose ever more collection, tracking, reporting, and management responsibility burdens on already busy project managers and their staff who should not be concerned with influencing perceptions of the relative importance of their project or program but should instead focus on bringing that individual project, or program of projects, they have been chartered with to successful fruition. In addition, the data they would report on is the same as always, resulting in the same decisions and levels of failure.

In summary, most, if not all, of these multi-project management tools have failed to provide any novel or useful mechanisms to address the challenge of consistently and comparatively analyzing and evaluating a vast array of project investments across an enterprise. They cannot adapt to evolving or differentiated capabilities and maturity levels within and across an enterprise or organization; cannot consistently identify the required elements of success for a project in order to mitigate them; cannot accurately predict the probability of a failure even before undertaking the project; and therefore, cannot reliably assure delivery of, nor value from, these investments.

The solution is to formalize, qualify, and quantify project definitions, risk profiling, capability profiling, and the effects of each on the other, hence this invention.

OBJECTS AND ADVANTAGES

Accordingly, besides the objects and advantages described in previous sections, other objects and advantages of the present invention are:
   a) to provide a consistent, comparative, standardizing framework including definition, structure, and usage, for modeling each of the distinct types of projects undertaken within an enterprise or an organization. This includes defining each of the required success elements for the project type in the form of components (representing for example, work products, events, and/or milestones) as well as assessing and determining the proportion that each success element contributes to reducing the total probability of failure for the project type;
   b) to support developing and maintaining valid risk profiles that adapt and adjust to evolving or differentiated capabilities and maturity levels within and across an enterprise or organization, that facilitate prioritizing and making impactful improvements to these capabilities and maturity levels, and that also facilitate narrowing or selecting project types based on the risk profiles;
   c) to provide iterative and progressive assurance that each of the investments in a particular project type will be successfully delivered (i.e., will not fail to meet a time, cost, or business requirement);

d) to provide iterative and progressive assurance that each of the investments in a particular project type will be successful at achieving targeted benefits in terms of goals and objectives and/or in terms of tangible financial value;

e) to provide objective (e.g., designated third-party) confirmation and validation of the growing existence of the defined success elements for the project type, thereby progressively reducing the total probability of failure of the project and measurably increasing confidence that targeted benefits of the project will be achieved;

f) to facilitate more complete and accurate determinations of potential conflicting or collaborative relationships between projects and assessing and evaluating the impact(s) of those relationships on overall risks and associated mitigation tactics;

g) to facilitate modeling, assembling, selecting, and adjusting more optimal (e.g., more productive, more efficient, better performing, more collaborative) project teams through broader consideration of supporting criteria about potential or existing team members such as their skills and experience, availability, and personality types when performing in associated roles as well as consideration of how the roles required for a given project team are currently contributing to risk levels throughout the enterprise or organization; and h) to provide for computerized means for storing and managing all such information and making it widely available through graphical representations that are interactive, readily manipulated, and support simulations to facilitate faster, more reliable and more actionable decision-making about the investments.

Still further objects and advantages will become apparent from a consideration of the ensuing description, drawings, and program.

SUMMARY

A method and apparatus for assuring delivery of, and value from, a wide array of investments in processes, people, technologies, and tools. The outcomes of the investments covered by the delivery and value assurance methods and apparatus described by this invention are all those achieved through projects.

The invention facilitates successful outcomes from projects by objectively, proactively, and progressively:

1) validating existence of predefined elements determined to reduce that project's probability of failure by a predetermined amount, sets of which are associated with each distinct type of project, and 2) tracking and increasing confidence in the likelihood of achieving beneficial impacts from each of the projects.

The method and apparatus further includes modeling project types and risk profiles, managing the processes for assuring delivery and value, modeling project teams, and rendering analytical views representing interactive graphical representations thereof.

DRAWINGS—FIGURES

FIG. 1—A process flowchart of one embodiment of modeling project types.

Figure 2:
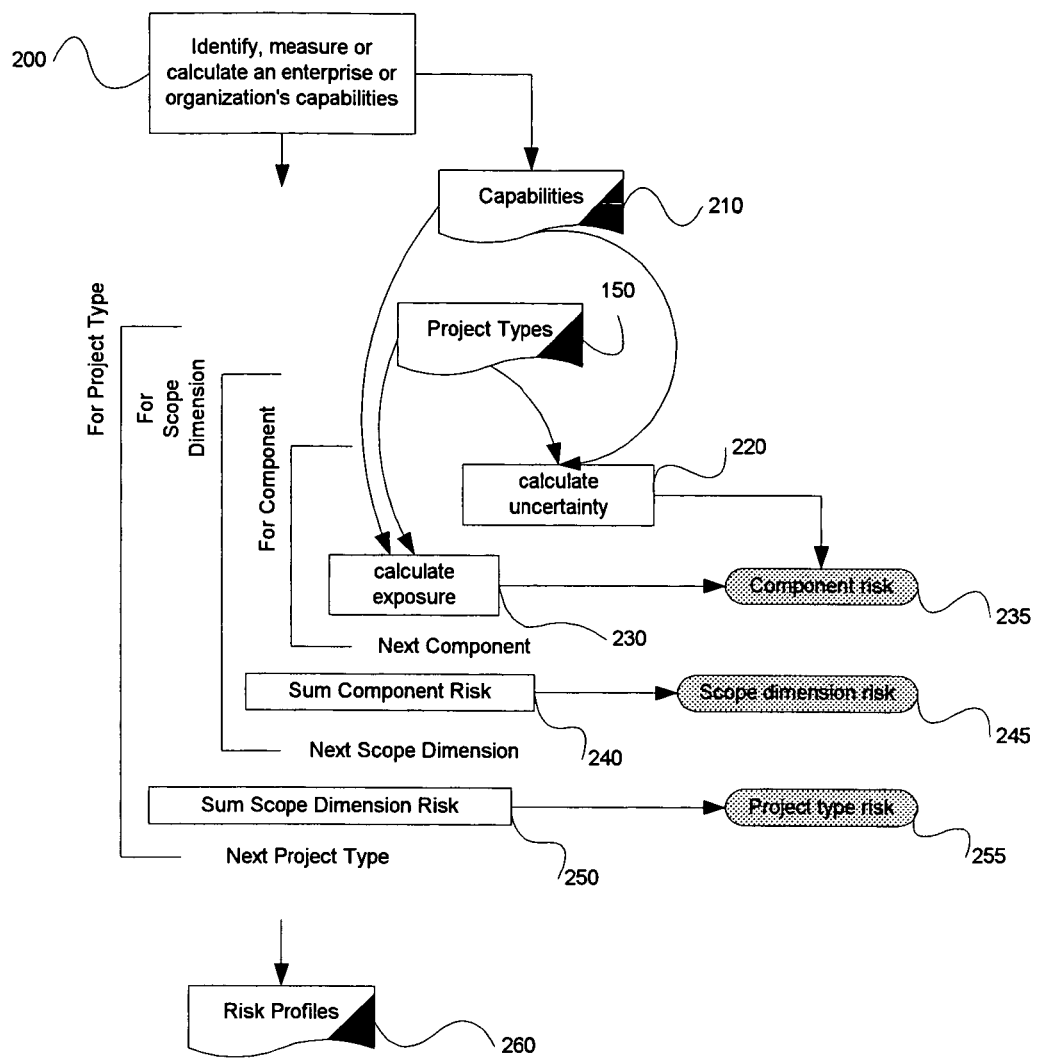

FIG. 2—A process flowchart of one embodiment of modeling risk profiles.

Figure 3:
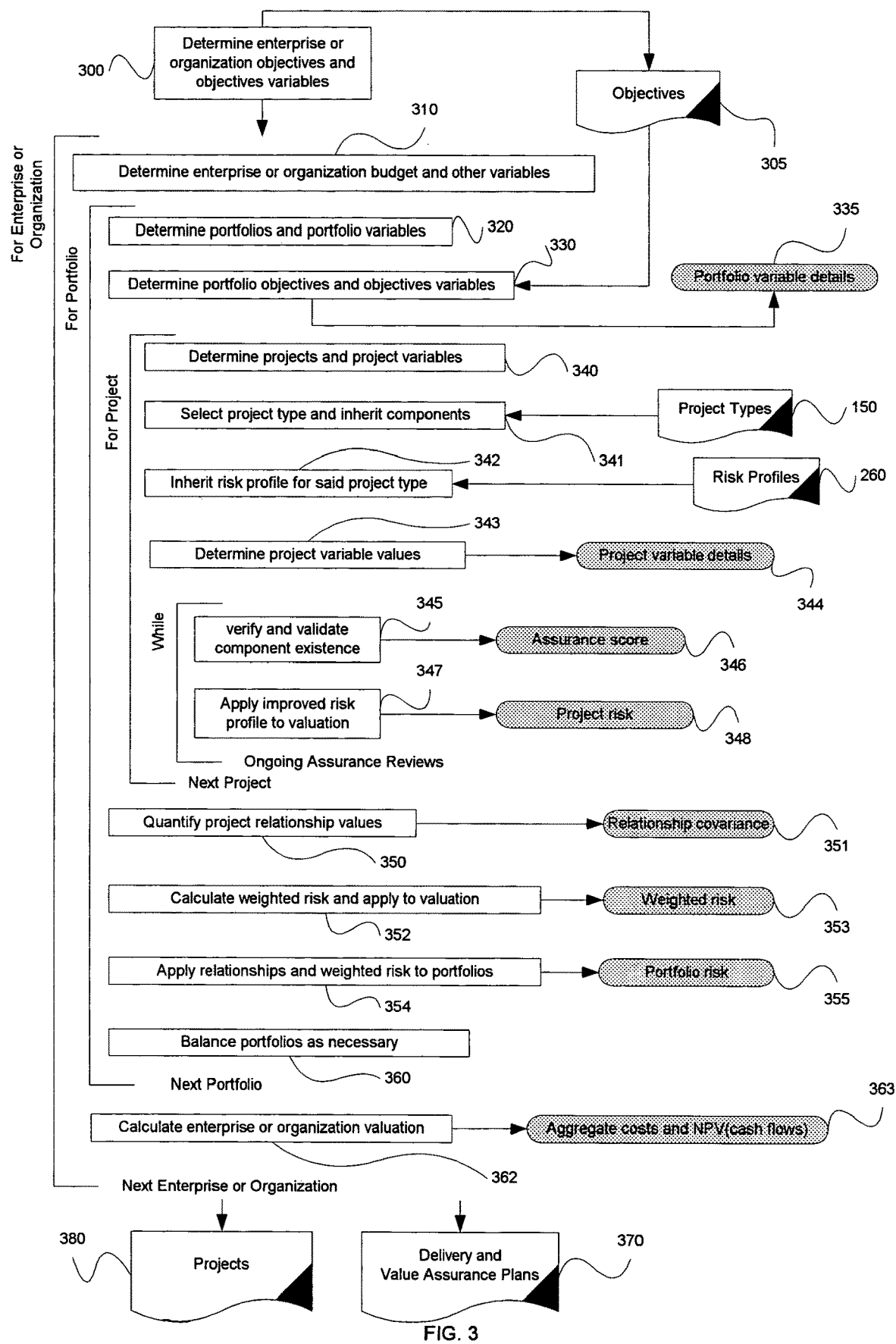

FIG. 3—A process flowchart of one embodiment of assuring delivery and value.

Figure 4:
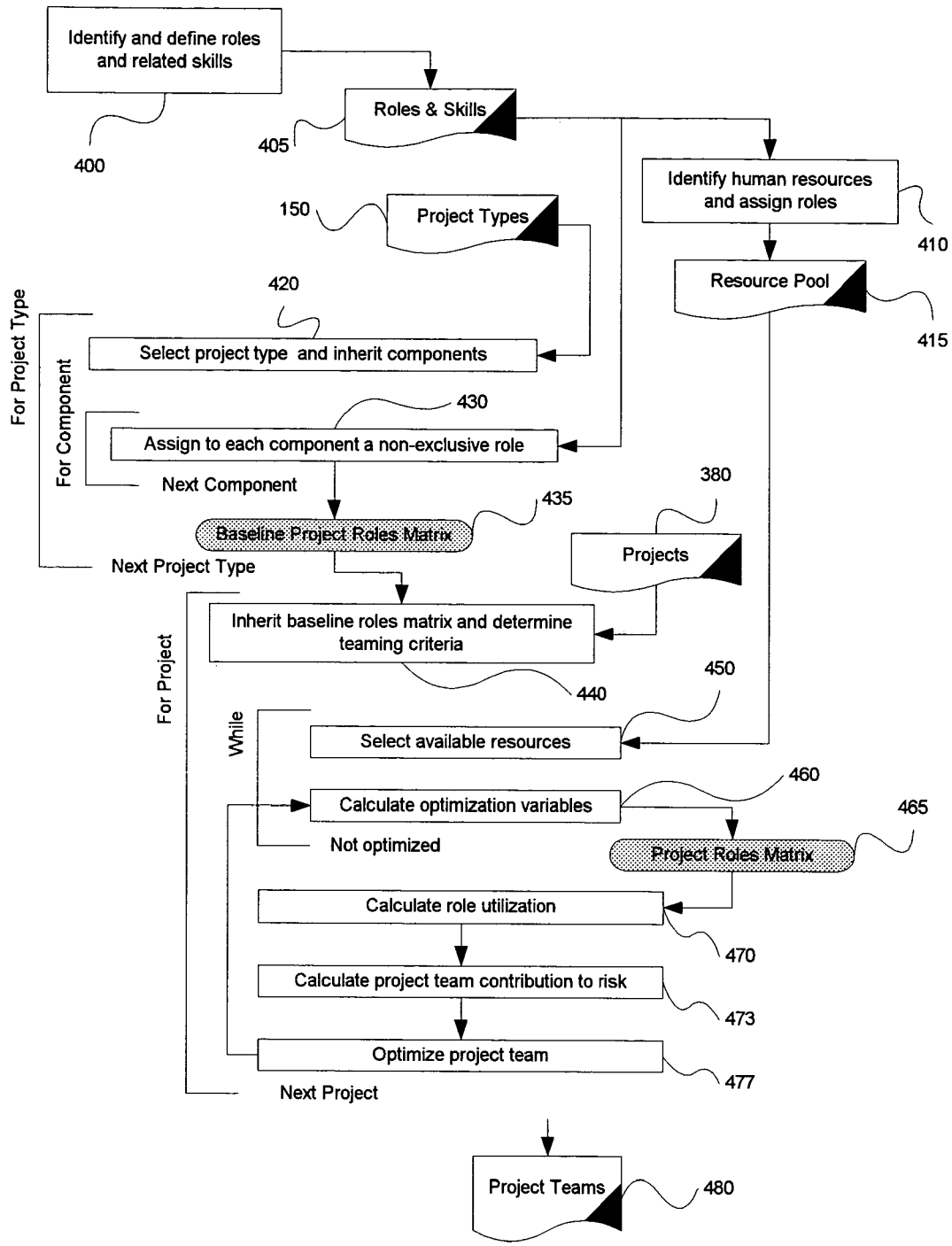

FIG. 4—A process flowchart of one embodiment of modeling high-performance project teams.

Figure 5:
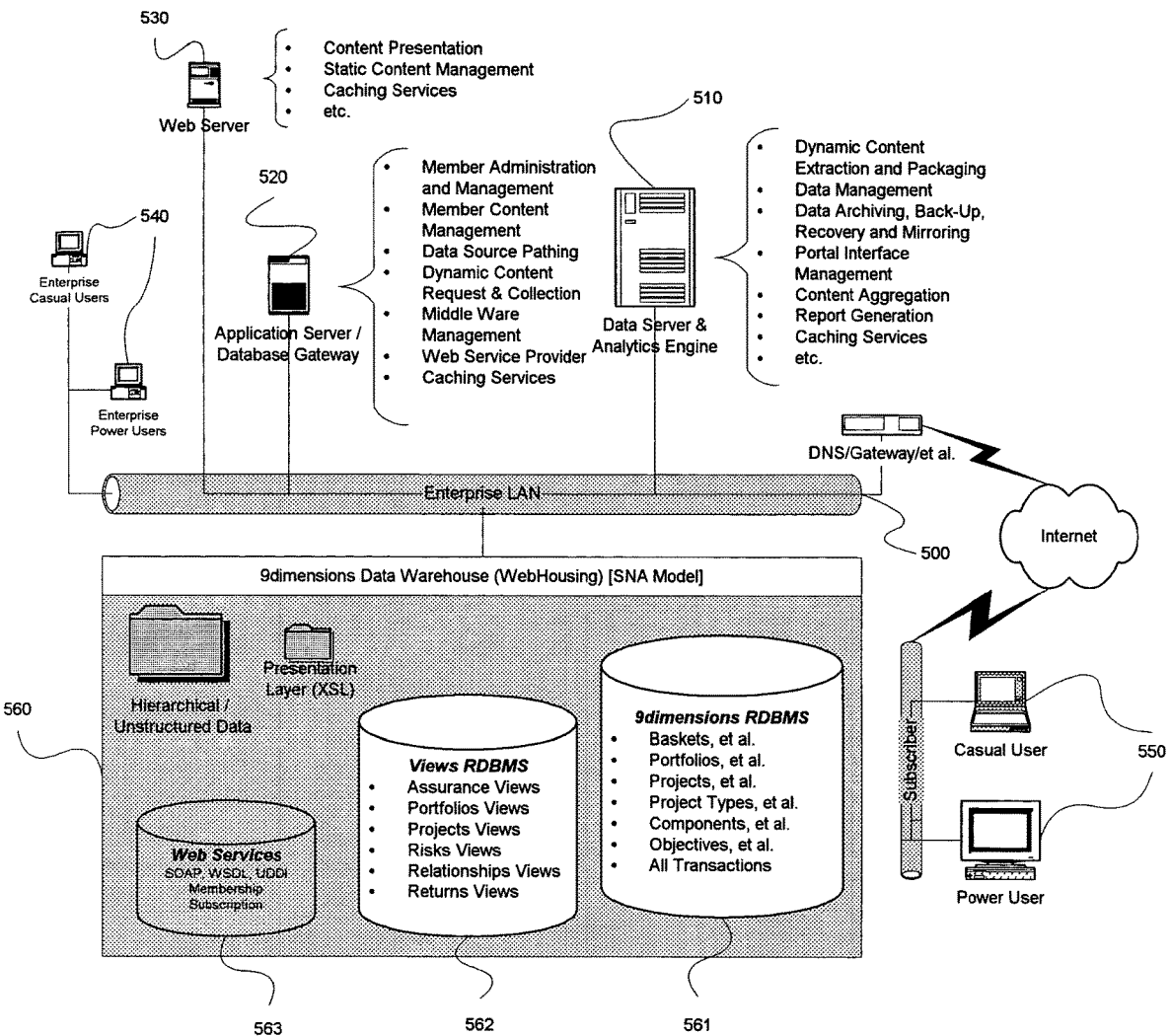

FIG. 5—A system architecture diagram of one embodiment of an apparatus providing means embodied therein for assuring enterprise investment delivery and value.

REFERENCE NUMERALS

Reference 100—The identification and creation of the underlying framework of scope dimensions by which all project types will be defined, typically a selection of vertical scope dimensions (strategic, tactical, operational, etc.) and horizontal scope dimensions (people, process, technology, etc.) and all related cross sections.

Reference 110—The identification of detail data to be collected, measured and or calculated for each scope dimension's underlying components (e.g., value, complexity, etc.)

Reference 120—For each project type and for each scope dimension and underlying component, identify and name the component and fully describe and articulate the impact of non-existence of the component.

Reference 130—Continue, for each scope dimension and underlying component, to measure or calculate all quantifiable variables.

Reference 135—Store all quantifiable variables for use in prioritization of components, and for calculating risk profiles.

Reference 140—Continue, for each scope dimension and underlying component, to determine duration.

Reference 145—Store the duration for later use in expiring and invalidating components and for use in calculating actual project risk, in support of delivery and value assurance.

Reference 150—Package and store project type profiles, all associated components and variables including duration, for use as templates in support of investments and project selection.

Reference 200—Identify and, measure or calculate capabilities for an enterprise or organization.

Reference 210—Store capabilities.

Reference 220—For each of the project types and each component, calculate uncertainty.

Reference 230—For each of the project types and each component, calculate exposure.

Reference 235—For each component, combine uncertainty and exposure to create component risk. Store component risk.

Reference 240—Sum component risk for each scope dimension.

Reference 245—Store scope dimension risk.

Reference 250—Sum scope dimension risk for each project type.

Reference 255—Store project type risk.

Reference 260—Package and store all project type risk profiles, with related uncertainty and exposure values.

Reference 300—Determine enterprise or organization objectives and objectives variables.

Reference 305—Store enterprise or organization objectives and variable details.

Reference 310—Determine enterprise or organization budgets and other variables.

Reference 320—Determine portfolios and portfolio variables.

Reference 330—Determine portfolio objectives and objectives variables.

Reference 335—Store portfolio objectives and portfolio variable details.

Reference 340—Determine projects and project variables.

Reference 341—For each project, select a project type; thereby inheriting all of its components.

Reference 342—For each project, inherit the project type's risk profile.

Reference 343—Determine project variable values.

Reference 344—Store project variable details.

Reference 345—As part of the assurance process, verify and validate existence of components.

Reference 346—Store most current assurance score aligned with assurance results.

Reference 347—As part of the assurance process, apply improved risk profile (from increasing existence) to maintain current project risk.

Reference 348—Store most current project risk.

Reference 350—For each portfolio, quantify the project relationships.

Reference 351—Store calculated relationship covariance based on project relationships.

Reference 352—For each portfolio, calculate weighted risk and apply to the portfolio valuation data.

Reference 353—Store the portfolio weighted risk.

Reference 354—For each portfolio, apply relationships and weighted risk to portfolios.

Reference 355—Store calculated portfolio risk based on relationship covariance and weighted risk.

Reference 360—Balance portfolios as necessary by eliminating, adjusting and/or adding new projects.

Reference 362—Calculate the enterprise or organization valuation data.

Reference 363—Store calculated aggregate costs and NPV of the cash flows.

Reference 370—Package and store all specific delivery and value assurance mitigation plans.

Reference 380—Package and store all specific project data.

Reference 400—Identify roles and define related skills including the minimum years of training and usage required to be proficient and duration of usefulness for said skills, resulting in a detailed roles and skills matrix.

Reference 405—Package and store roles and skills.

Reference 410—The identification of human resources and the measure of each person's skills within identified roles, resulting in a resource pool.

Reference 415—Package and store resource pool.

Reference 420—For each project type, inherit all components.

Reference 430—For each project type, assign roles to components in order to create a baseline project roles matrix.

Reference 435—Store baseline roles matrix.

Reference 440—For each project type, inherit the predetermined baseline roles matrix.

Reference 450—For each project type, select from available resources and assign named resources matching roles in the inherited baseline project roles matrix.

Reference 460—Iteratively remix and calculate optimization variables to create optimal team.

Reference 465—Store optimal team.

Reference 470—For each project, calculate role utilization.

Reference 473—For each project, calculate role contribution to risk.

Reference 477—For each project, remix and optimize team if necessary.

Reference 480—Package and store project teams and all related data.

Reference 500—The local area network on which the computer programs, databases and servers will communicate and interact.

Reference 510—The main data server and analytics engine where all data is managed and where the background analytics code is executed.

Reference 520—The main application server where all requests for data and analytics are made and acted on.

Reference 530—The main web server where all data website views are cached and stored for faster access and presentation.

Reference 540—The direct access points for casual and power users of the application.

Reference 550—The external access points for casual and power users of the application.

Reference 560—The storage area network composition (SNA) of the application, including RDBMS (Relational database management systems), flat file structures and BLOBS (Binary large objects.)

Reference 561—The main software database instance containing all underlying data.

Reference 562—The views database where all current and historical analytic views are stored.

Reference 563—The web services database where all web service access rights, definitions and business rules are stored.

DETAILED DESCRIPTION

The present invention in a preferred embodiment provides a project-driven investment delivery and value assurance method and apparatus. The term "project" as used herein includes any undertaking requiring concerted and defined effort over a period of time and which is directed at achieving one or more specific outcomes.

The preferred embodiment of the present invention is as a management information system for large enterprises. A large enterprise is defined as an organization that makes total annual investments in new or changed business capabilities delivered through projects, programs, or initiatives, in aggregate, exceeding $200 million (in 2004 USD) or more. However, the present invention is not limited to large organizations, but is applicable to any industry or vertical market where significant relative financial resources are applied in achieving defined objectives that are considered important and worthy of optimal care and management attention.

In an exemplary embodiment of the method, as illustrated by FIGS. 1-4, the investment delivery and value assurance method includes four distinct submethods. These include modeling project types [FIG. 1], modeling risk profiles [FIG. 2], managing and conducting assurance processes [FIG. 3], and modeling project teams [FIG. 4]. An exemplary embodiment of the apparatus, which in totality manages all the data and information associated with the method and renders analytic views, is illustrated by FIG. 5.

While the invention is described with reference to four distinct submethods and an apparatus for managing data and rendering views for ease of explanation, the invention also contemplates any number of submethods, wherein the submethods can be separate, interrelate, overlap, or depend in any way on each other. Moreover, alternative embodiments may include either manual analysis of data discussed herein

[FIGS. 1-4] or entry of data into a computer usable medium [FIG. 5] for computerized analysis of the data; both options producing valuable results.

Modeling Project Types [FIG. 1]

Defining a Framework and Associated Scope Dimensions [Ref. 100]

In accordance with a preferred embodiment the first submethod, modeling project types [FIG. 1] includes a series of steps that enables personnel of an enterprise or an organization to create a framework of scope dimensions 100 that are standard and applicable across the enterprise. These scope dimensions 100 should be selected based on a thorough understanding of the type of business the enterprise is in e.g., Construction, Health Care, Banking, or High-Tech, as well as consideration of the different business areas of the enterprise such as IT, Finance and Accounting, Human Resources, Manufacturing, etc.

The scope dimensions 100 must be applicable to any kind of project within the enterprise and should therefore be representative of what is common to all projects within the enterprise. In this first embodiment, a framework has scope dimensions 100 of "processes," "people," and "technologies/tools" arrayed against time-driven or phase-driven scope dimensions 100 of "strategic," "tactical," and "operational"; thereby creating nine dimensions, one at each distinct intersection e.g., processes v. strategies or technologies v. operations.

In this preferred embodiment of a framework 100, "processes" represent the efforts, activities, work and production that takes place; essentially all business capabilities of an enterprise, including external resource procurement, because when you decide to hire consultants or contractors, you're first and foremost hiring a particular capability (or process expertise) on a short-term basis rather than hiring a specific person.

"People" represent employee labor, the personnel who work directly for the company, as well as the logical organizational entities and geographic locations that group them and help define them such as HR, IT, Marketing, Midwest, etc. Contract employees would not be included in this dimension but rather in the process dimension for the reasons mentioned previously.

"Technologies/tools", in this exemplary embodiment, represents a much broader perspective, namely any and all material and physical assets (used or owned by people or processes, tangible and intangible) including facilities, hardware, software, networks—even furniture and equipment; all the physical assets that can be brought to bear in investments.

"Strategic," or alternatively "strategies," represents all the answers to "what and why" kinds of questions about a project investment. In terms of the investment lifecycle, it includes the earliest stages of planning, issue identification and solution drafting, investment definition (solution choice), initial estimating and prioritization activities, etc.

"Tactical," or alternatively "tactics," represents all answers to the "where, when, who, and how" questions involving named investments (executing on projects) up to and including their implementation or transition into production; in this first embodiment, this transition time is referred to as the event horizon.

"Operational," or alternatively "operations," represent answers to the same "where, when, who, and how" questions as in tactics but instead in relation to investments after they have been made operational, when the organization is most actively engaged in maximizing and realizing the returns and benefits from that investment.

In alternative embodiments, depending on the enterprise, such scope dimensions might instead comprise something like process, organization, location, data, applications, and technology with the framework representing them in a hexagon for example, the first three in the top three boxes and the latter three in the bottom three boxes. Many other alternative embodiments are contemplated by this invention.

Defining Required Success Elements (Components) [Refs. 110-145]

Once the framework and scope dimensions 100 are defined, all required success elements must be identified 110, including related variables 110, then each is associated with one of the dimensions 110. Required success elements are all the components that are individually distinct and deemed essential to producing successful project outcomes. Components represent standard or common work products, events, or milestones (deliverables) routinely produced in the course of accomplishing projects. These components should be known and understood by people skilled in the general art of managing projects e.g., components like a project plan or a business case, or those who are skilled in contributing to specific kinds of projects e.g., components like a system test plan, a network schematic diagram, or a logical data model.

Once identified 110, each component should receive a description 120 (preferably including a link to a leading example of the component) and the impact of its absence noted 120. The other related component variables 130 should also be determined for the component. In a preferred embodiment, these component variables include complexity, value, compliance, and retention. In addition, duration 140, or "half-life", is also a related variable in a preferred embodiment. Duration being one of the key and novel usages of time that once elapsed, changes the dynamics of the project and hence keeps it "alive" well beyond the completion of the project.

In alternative embodiments, the component variables may also include a category e.g., "project," that the component belongs to if there is a defined investment hierarchy which groups together projects into other named hierarchy elements e.g., portfolio, each having required success elements specific to that hierarchy element.

The complexity 130 of a component is a measure 135 of the relative difficulty to produce the component on a project. Value 130 is a measure 135 of the relative importance or weight of the component in influencing the project's success. Compliance 130 identifies any situation(s) 135 where the component facilitates satisfying one or more regulatory or mandatory reporting issues e.g., HIPAA (Health Insurance Portability and Accountability Act), the USA Patriot act, or Sarbanes-Oxley. Retention 130 is a measure 135 of the length of time, if any, an incarnation of the specific component must be archived for corporate or legal purposes (usually associated with a compliance requirement). Duration 140 is a determination of the period 145, most commonly anywhere from weekly to forever, that the content of an incarnation of the component will be considered to remain valid in contributing to a successful project outcome, without needing reassessment. As an example, a project plan may have duration 145 of a month whereas a business resumption plan may either have duration 145 of a full quarter or need reassessment semi-annually.

Each of these identified components 110 is assigned to exactly one dimension of the framework 110. The dimension should be chosen which best represents the chosen scope dimension(s) relative to the component. As an example, a business case component would belong to the "processes:

strategic" dimension because it helps answer the "what and why" questions about a project and emphasizes or focuses on processes/business capabilities.

Defining Project Types [Ref. 150]

In a preferred embodiment, a draft comprehensive list of candidate project types 150 present within the enterprise occurs in parallel with the steps above but may also occur serially, either before or after. Candidate project types may include those related to custom software development projects, package software implementation projects, customer satisfaction assessment projects, or market feasibility studies. Final and distinct project types 150 are developed by compiling unique combinations of components best representing the minimum required success elements for a project of that project type.

These distinct project types 150 become templates in support of investments and project selection. The important thing to consider is that if any one of the components were missing from a project type 150, an investment in that project type is more likely to fail, and for each additional missing component, the probability of failure increases accordingly.

Modeling Risk Profiles [FIG. 2]

In accordance with this exemplary embodiment, a second submethod, modeling risk profiles [FIG. 2], includes a series of steps that enable personnel of an enterprise or an organization to quantify and document intrinsic uncertainty and exposure values, tailored to their capabilities 210, for each project type 150 thereby creating comprehensive risk profiles 260 for the project types 150.

Measuring Capabilities [Refs. 200-210]

In accordance with this second submethod of the invention, the first step is to identify and measure capabilities 200 that broadly represent the enterprise's current ability to deliver on their investments. The resulting capability profile 210 encompasses the current general level of abilities—relative to other areas of the company, similar companies, or the industry as a whole—in identifying issues, solving issues, and then executing on solutions to these issues within the enterprise. The term "issue" is not intended to denote either a good or a bad thing specifically, but rather to represent a change, disruption, or adjustment of some sort that requires a response.

In this preferred embodiment, the ability to identify issues, solve issues, and execute on the solutions to issues would each be measured at each scope dimension of the framework; in this case resulting in twenty-seven assessment areas. As an example, for the "processes:strategic" scope dimension, the ability of the enterprise to identify issues arising in processes covering strategic phases of investments could be assessed as, "Low", "Below Average", "Average", "Above Average", or "High". While certain specific embodiment examples of values for variables are described in a specific order, one skilled in the art will appreciate that any number of other specific alternative embodiment examples in any order and for similarly suitable purpose may be substituted in the present invention.

At the outset, these measures would be equal in importance but if necessary, the three capability areas (identify, solve, execute) can be weighted for their relative importance to the enterprise. In a first embodiment, this weighting holds fixed, in turn, each of the three time-phased scope dimensions 110, strategic first, while assigning a weight representing the relative importance of the capability areas 210 associated with processes, then with people, then with technologies; then doing the same for the tactical and operational scope dimensions 110.

If the aggregate capability areas 200 are of equal importance to the enterprise, e.g., identifying, solving, and executing issues arising within each scope dimension 110 is of equal importance, then each would be weighted at $1/9^{th}$ of 100% or approximately 11.11% apiece. However, as an example, if the enterprise is a software products firm, they may decide that identifying, solving, and executing on issues arising across the technologies dimensions are of greater importance to the enterprise's overall success, they can weight that more heavily. In other situations, such as consulting firms or law firms, the people dimensions may be considered more substantive to enterprise success. Such subtleties of alternative weightings are best acquired through experience and consideration of past performance.

The assessment of an enterprise's capability profile 200 can manifest itself in a number of ways. For some enterprises, a simple assessment based on conjecture may be sufficient to start. For other enterprises (usually further along the maturity scale), more in-depth, structured assessments, measurements, and weightings, some of which may already exist within the enterprise, can be considered in finalizing the capability profiles i.e., capabilities 210. In the end, one or more of these capability profiles 210 is created. For an enterprise having multiple profiles, these should reflect substantive variations in business areas or other organizational areas within the enterprise. Multiple profiles are preferred if either the specific embodiment of the invention is expected to require it (e.g., for scenario development or flexibility) or if, as stated previously, the profile is known to vary considerably from one business area or entity to another such that using a single enterprise risk profile would be significantly less accurate under certain investment conditions.

Applying Capability Profiles [Refs. 150, 220-260]

In accordance with this preferred embodiment, applying the capabilities 210 to project types 150, comprises a number of steps including calculating uncertainty 220, calculating exposure 230, summing component risk 240 for each scope dimension 245, and summing scope dimension risk 250.

Calculating uncertainty 220 for each project type 150, means calculating the probability of failure of the particular project type 150 adjusted for the current state of the capabilities 210. In this preferred embodiment, uncertainty for a project type 150 is a summation across scope dimensions 110, of a) the individual complexity value 135 for each of the components 120 of the project type 150, divided by the sum total of all complexity values 135 for the project type 150, and b) multiplied by the capabilities 210; subtracted from 1. The following equation helps illustrate this first embodiment of uncertainty.

$$\text{Uncertainty}_{Project\_Type} = 1 - \sum_{Scope\_Dimensions=1}^{Count(Scope\_Dimensions)} \text{Capability}_{Scope\_Dimensions} \times \left( \frac{\text{Complexity}_{Scope\_Dimensions}}{\sum \text{Complexity}} \right)$$

This results in an intrinsic uncertainty 220 associated with each project type 150 representing the probability of failure of the project type 150 given current capabilities 210.

In alternative embodiments, this uncertainty 220 could merely be any subjective determination and not an actual calculation, or the calculation might include additional component variables 135 or be defined in some other way that creates a meaningful probability of failure for the project types 150.

Calculating exposure 230 for each project type 150, means calculating the liability multiple arising from an occurrence of failure of the project type 150. It represents a measure of the magnitude of impact resulting from a failure. In this preferred embodiment, exposure for a project type 150 is a summation across scope dimensions 110, of a) the weighting of the relative importance of the capabilities 210 for the scope dimension 110 multiplied by a) the total sum of complexity 135 and value 135 for the scope dimension 110 divided by b) the total count of components 120.

$$\text{Exposure}_{Project\_Type} = \sum_{Scope\_Dimensions=1}^{Count(Scope\_Dimensions)} \text{Weight}(\text{Capability}_{Scope\_Dimensions}) \times \left( \frac{\text{Complexity}_{Scope\_Dimensions} + \text{Value}_{Scope\_Dimensions}}{\text{Count}(\text{Components}_{Scope\_Dimensions})} \right)$$

This results in an intrinsic exposure 230 for the project type 150 that is reflective of the fact that damage to the enterprise from a failure is at least partially dependent on the importance of the capabilities 210 involved and the number of required success elements. The latter reflecting logic that the more things you work on 120 for a project type 150, the more the risk of failure is distributed or diversified across the components 120.

In alternative embodiments, this exposure 230 could merely be any subjective determination and not an actual calculation, or the calculation might include additional component variables 135 or be defined in some other way that creates a meaningful liability multiple for the project types 150.

In this preferred embodiment, once uncertainty and exposure exist for each project type, you also know the uncertainty and exposure contributions for: 1) each component, which together represents component risk 235, and 2) each scope dimension 110, which together represents scope dimension risk 245. The sum of all scope dimension risk 250 results in project type risk 255. In total, these together comprise the risk profiles 260 for each project type 150 within an enterprise or organization.

Assuring Delivery and Value [FIG. 3]

In accordance with this exemplary embodiment, a third submethod, assuring delivery and value [FIG. 3], includes a series of processes and steps that enable personnel of an enterprise or organization to develop risk mitigation steps, priorities, and actions that iteratively and progressively reduces project risk, subsequent portfolio risk, and variances in cost, earned value, and/or net present value (NPV).

Determine Enterprise or Organization Objectives and Other Variables [Refs. 300-310]

In accordance with this third submethod of the invention, the first step is to identify enterprise or organization objectives and associated objectives variables 300. An enterprise or an organization is comprised of a collection of plans each articulating one or more associated objectives. Resources are applied to achieving these objectives on an ongoing and ever-evolving basis. The application of resources to achieve one or more of the objectives is an investment delivered through means of projects. The critical element in all this is the objectives 305 themselves. Without them, investments cannot be chosen or evaluated with optimum effectiveness because the purpose behind those investments and their outcomes are unclear.

Plans and their associated objectives are usually published, reviewed, and updated on a regular, if infrequent, basis in most enterprises as part of a strategic planning process. Typically, strategic planning and budgeting cycles drive new investment formulation and existing investment realignment. In the best situations, these investment activities and decisions take place because of clearly defined and articulated objectives 300 that the enterprise or organization wishes to achieve in order to improve its business prospects and other aspects of its finances and operations.

In a preferred embodiment of this invention, measurable objectives are identified 300 and then variables associated with the objectives are further described 300. In this preferred embodiment, additional variables 300 further describing the objectives are; 1) a quantifier that takes on a value of "currency," "percentage," or "other," 2) a target direction that takes on a value of "decrease," "increase," or "keep same," 3) a priority that takes on a value of "Low," "Medium/Low," "Medium," "Medium/High," or "High", 4) a goal that is the amount of quantified change targeted for the specific goal and objective, 5) a baseline that reflects the actual measure as of either the date of publication of the goals and objective, or the beginning of the fiscal year, and 6) a start period and 7) an end period the latter two being start and end dates for the period in which the enterprise would like to confirm achievement of the full goal.

As an example, an enterprise might have a plan mentioning price competition that might have an associated high priority objective to reduce total cost of goods sold (COGS) by $400,000 by the third quarter of a calendar fiscal year. In this example, the quantifier is currency, the target direction is decrease, priority is high, the total goal is $400,000.00, baseline is $9,000,000.00 and the start and end periods are Jul. 1, 200X to Sep. 30, 200X, as examples.

The preferred embodiment of this invention also supports tracking past values at defined periods of time for measurable objectives to support impact identification and for identifying cyclical and other trends that may affect the association of investment outcomes to objective impacts.

In accordance with this preferred embodiment, in addition to the objectives 305 for the enterprise and each defined sub-organization within the enterprise if appropriate, the budget for each enterprise or organization for the fiscal year is also captured 310 as are other variables 310 such as a description and the parent entity (if applicable).

Define Projects and Portfolios [Refs. 150, 320-344]

In accordance with this preferred embodiment, projects are identified, named, and project variables are assigned 340 for further definition. In this exemplary embodiment, each project 340 is assigned 341 a single project type 150; thereby inheriting all the components 341 and the risk profile [Refs. 260, 342] associated with the project type 150.

Other project variables 340 and their details 344 include; 1) a status that takes on a value of "queued," "denied," "active," "cancelled," or "completed," 2) a description that varies by project and briefly states the overall purpose of the project and optionally describes the project across each scope dimension, 3) analysis notes that support justifying a change from one status to another, 4) a start date that should reflect the date in which financial aspects (e.g., costs) of the investment begin to accrue, 5) an event horizon that reflects the date the project will be implemented and usually reflecting the "go live" date or the date when beneficial financial aspects or impacts on one or more objectives should first begin to accrue/be observed, 6) an end date that reflects the date the project is either expected to fully achieve its expected value or outcomes or, the date the project investment is expected to transition to another project type investment (e.g., a distinctly new investment of an operational- or production-oriented project type) or, a termination date after which no further investments will be made in the project (may be the date status is set to "denied" or "cancelled" or "completed"), 7) an initiative manager e.g., the project manager, 8) a delivery assurance manager that names the individual who will be performing assurance reviews for the project, and one or more of 9) cost, earned value, or cash flows that are financial investment amounts in the project and can be a single amount e.g., a fully loaded estimated project cost, or better yet, multiple entries can be maintained throughout the project making all related information more accurate.

In the preferred embodiment, candidate portfolios and associated portfolio variables can be identified and named 320 either before the projects 340 or in parallel with the projects 340. Each project is assigned to one portfolio. Portfolios are defined 320 based on groupings of related projects or based on one or more similar objectives 330 that the projects selected for the portfolio affect in combination and which are associated 330 with the portfolio. Portfolios 320 may also be groupings of one or more other portfolios to create more refined hierarchy structures.

In this preferred embodiment, portfolio variables 320 and other details 335 include; 1) a description, 2) a portfolio manager i.e., the individual responsible for achieving overall value from the underlying projects e.g., a business sponsor or a program manager, 3) an assurance manager i.e., the individual responsible for performing assurance reviews for the portfolio, 4) portfolio objectives 330 that are either chosen from the enterprise or organization objectives 320 described earlier, or which are determined to be new or different 330, 5) a weighted average risk calculation based on the underlying project risk and the NPV of all cash outflows (or a single period 0 full cost estimate), 6) a relationship covariance calculation, and 7) a total risk calculation based on the prior two variables. Each portfolio objective has associated portfolio objectives variables 330 including a goal, an observation period assigned having start and end dates, corresponding to the timeframe that desired impacts from the portfolio are expected to most clearly manifest themselves. Typically, these measurement periods fall after the event horizon of one or more of the underlying projects so that the returns and benefits from the investments can take hold.

As an example, a portfolio is defined [Refs. 320-335] called "eProcurement" and assigned to a parent portfolio called "Manufacturing and Distribution." The eProcurement portfolio is expected to affect three different portfolio objectives; it will keep "Current Assets" the same, it will increase "Sales" by $97,000.00, and it will decrease "Cost of Goods Sold" by $120,000.00. In this example, the portfolio objective goal related to COGS, reducing by $120K, is contributing a portion of the enterprise objective goal for COGS to reduce it by $400,000.00 described earlier. It would therefore be important to try to set an observation period for the portfolio objective related to COGS that is prior to the end of the third quarter (the observation period set for measuring this same enterprise objective) to facilitate proper crediting.

In alternative embodiments, the portfolios may also have components associated with them based on the underlying project types of each project within the portfolio; components associated with the portfolio level are then associated with the portfolio. Other alternative embodiments contemplated by this invention may include the addition of designated investment category selections to the project variables 340 or portfolio variables 320. These categories are helpful mechanisms supporting evaluating, on a relative scale, the types of investments across the enterprise or organization. These categories can range from the entirely simplistic such as "core," "growth," and "venture" to more complex distinctions around increasingly less discretionary groupings such as; Speculative Business Investments, New Business Ventures, Business Growth/Expansion, Existing Business Enhancements, Infrastructure Upgrades, Existing Business Sustainment, Corporate Mandates, and Legal/Regulatory Mandates.

Further alternative embodiments may include the ability to assign 341 multiple project types 150 to a project, each assignment 341 being treated in accordance with the projects described above. In addition, alternative embodiments may include more detailed hierarchies consisting of baskets, portfolios, and projects; baskets being groupings of other baskets or of portfolios, and portfolios being groupings of other portfolios or of projects. The hierarchy should reflect the common and shared understanding about the enterprise or organization. That may mean establishing a hierarchy that mirrors the organizational structure for example. It may also mean including hierarchy elements such as baskets or portfolios that reflect strategic objectives such as entering a new market or producing a new product or it could reflect investment/budgeting categories such as core, non-discretionary, discretionary, etc. The choice of how to categorize and organize investments is an important and enduring one and many alternatives are contemplated by this invention.

Execute Ongoing Assurance Reviews [Refs. 345-346]

In accordance with this preferred embodiment, upon the establishment of a project 344, and the assignment of an assurance manager to the project 343 and to the portfolio 320, the assurance review process [Refs. 345-348] initiates. This process comprises having the assurance managers verify and confirm valid existence of components for each project 345 to; a) reduce each project's probability of failure by a predetermined amount based on the component's predetermined contribution to the associated risk profile 260, and b) progressively increase confidence in the likelihood of achieving beneficial impacts from each of the projects. The running total of components deemed to exist, adjusted for components which have had their existence expire based on the duration without yet being reconfirmed, is the project's assurance score 346.

This invention uses the term "existence," in regard to the components of a project, as an underlying variable driving the analytics behind calculation of assurance scores and value confidence levels which in combination comprise project risk. The existence litmus test is defined as said component being a) complete in its content coverage, b) up-to-date and fresh in its content, and b) the content has been communicated in a timely manner to all individuals who should know about it.

Any violation of the above three criteria is a breach of existence and the component is not deemed to exist. In addition, the preferred embodiment of this invention utilizes the concept of a "duration" for components such that previously completed components for a specific project (components that were observed and passed the existence test in the past) can automatically expire on a time-driven basis set during creation of the component's definition. This supports this invention being a living model of project investments.

An assurance review manifests itself through a variety of means such as; meeting with project team members and other project stakeholders to review and discuss components, evaluating and discussing project relationships 351, compiling assessment results, maintaining component "leading practices," distributing example components, and training personnel in key areas of an assurance manager's expertise as appropriate, among others. Many other alternative embodiments of the assurance review process are contemplated by this invention and will be appreciated by one skilled in the art.

Maintain Ongoing Project Risk Calculations [Refs. 346-348]

In this preferred embodiment, project risk is the intrinsic project type risk profile 260 multiplied by the most current assurance score 346. The assurance score 346 is a function of the number of components that exist for the project (a binary measure such that component existence is assigned "1" and if the component does not exist or it has expired based on a duration setting, it is assigned "0") and the value associated with those existing components relative to the total value of all components. In this manner, project risk is reduced more rapidly if the most valuable components, those having the most influence on the project's success, are brought into existence more rapidly.

$$Project\_Risk_{Project} = \frac{(Uncertainty_{Project\_Type} \times Exposure_{Project\_Type})}{Risk\_Profile_{Project\_Type}} \times$$

$$\left( \frac{\sum_{C=Components_{Project}=1}^{Count(C)} (Exists_C = \{0, 1\}) \times \left( \frac{Value_C}{\sum_{C1=1}^{C} Value_{C1}} \right)}{Assurance\_Score_{Project}} \right)$$

In alternative embodiments contemplated by this invention and mentioned previously, components can exist at the portfolio level. In that case, existence is conducted in the same manner for those components. In other embodiments, this project risk 348 could merely be any subjective determination and not an actual calculation, or the calculation might include additional component variables 135 or be defined in some other way that creates a meaningful risk value for the project 344.

Quantify Project Relationships [Refs. 350-351]

It is common knowledge for those skilled in the art of financial investment portfolio management involving equities that correlations exist between distinct equities within a portfolio. In the case of these equity portfolios, such correlations are bi-directionally equivalent; meaning the correlation between equities "i" and "j" is the exact same as the correlation between equities "j" and "i."

In an exemplary embodiment of this invention involving project investments, the relationships between projects can be either bi-directionally equivalent or bi-directionally distinct. The potential impact of a project "i" on a different project "j" could be distinct from the potential impact of project "j" on project "i."

This difference, which can be appreciated by one skilled in the art of projects, exists in part because; a) the multiple scope dimensions of the framework 100 are more independent of each other, b) there is a greater dependence on human factors in determining outcomes, and c) chaos elements exist because a project meets the mathematical definition of chaos—"a dynamical system that has a sensitive dependence on its initial conditions." For these reasons, the preferred embodiment of this invention allows for project relationships that are bi-directionally distinct.

In this preferred embodiment, there are two ways to approach quantifying project relationships 350: 1) At the aggregate level (one project to another in aggregate), or 2) At each scope dimension of one project to each of the same scope dimensions in the other (more detailed and useful). In this preferred embodiment, quantifying project relationships 350 means assessing, for each distinct project within a portfolio, whether there is a probable impact of this project on a different project. This can be the case if the projects are using the same resources, conforming (or not) to standards/architecture, are dependent on each as in a program, or any of a number of other reasons that one skilled in the art of projects and programs will appreciate. In this invention, the project variables, particularly the descriptions of the project across each scope dimension 110, and the portfolio variables can be helpful in identifying potential conflict areas or collaborative areas, as can the analytic views created by the apparatus.

If there is a probable impact i.e., a relationship exists, than it can be evaluated as either positive, negative, or neutral. If it is positive or negative, it can be assessed as either strongly or weakly correlated. If the project relationships are positive, this does not necessarily mean the same thing as "good". What it does mean is that a success in one project will likely result in a success in the other project just as a failure in one will likely result in a failure in the other, all around the identified collaborative or conflicting area. If the project relationships are negative, then for an identified collaborative opportunity or area of conflict, success in one will encourage failure in the other and vice versa; they move in opposite directions. The strongly or weakly correlated designation serves to characterize the relative probability or magnitude of the impact occurring. Two strongly, positively correlated projects are more prone to impacting each other than two weakly, positively correlated projects.

As an example, one project might be able to reduce risk and cost by leveraging the learnings of a similar project investment that happens to be further ahead in its development cycle. In another case, a different investment may be scheduled to "go live" during the same time period as another investment but needs the same resources. If recognized in advance, such conflicts can be mitigated at the lowest possible cost. Just as risk can cause standard deviation around expected costs of a project or portfolio of projects, relationships between projects also contribute (or detract) from the accuracy of the portfolio estimates.

Relationship covariance 351 is the term for the measurement of the impact a pair of projects within a portfolio will have on the portfolio risk as a result of their interactive effects (correlations) and their standard deviations. It is calculated as a function of each project's NPV cash inflows and outflows (or if cash flows don't exist, total estimated costs) within the portfolio, the total portfolio NPV cash flow, and the correlation coefficient representing the strength of the relationship. Relationship covariance is an important concept that, in concert with assurance reviews and cash flow tracking, provides a more complete picture of likely outcomes for a project's or a portfolio's estimated (or actual) risks and returns.

$$\text{Relationship\_Covariance}_{\text{Portfolio}_{\text{Project}_j \neq \text{Project}_i}} = \text{W\_Cov}_{j,i} +$$

$$\text{W\_Cov}_{i,j} \begin{pmatrix} \sum_{j=1}^{(\text{Count}(\text{Projects})-1)} \sum_{i=j+1}^{\text{Count}(\text{Projects})} \underbrace{\left(\dfrac{\text{NPV}(\text{Cash\_Out}_j)}{\text{NPV}(\text{Cash\_Out}_{\text{Portfolio}})}\right)}_{\text{Proportion of total portfolio costs respresented by project "j"}} \times \\ \underbrace{\left(\dfrac{\text{NPV}(\text{Cash\_Out}_i)}{\text{NPV}(\text{Cash\_Out}_{\text{Portfolio}})}\right)}_{\text{Proportion of total portfolio costs respresented by project "i"}} \times \\ \underbrace{\text{Correlation}_{j,i} \times \text{Assurance\_Score}_j \times \text{Assurance\_Score}_i}_{\text{Weighted Covariance of Project "j" to Project "i"=W\_Cov}_{j,i}} \end{pmatrix}$$

$$\begin{pmatrix} \sum_{i=1}^{(\text{Count}(\text{Projects})-1)} \sum_{j=i+1}^{\text{Count}(\text{Projects})} \underbrace{\left(\dfrac{\text{NPV}(\text{Cash\_Out}_i)}{\text{NPV}(\text{Cash\_Out}_{\text{Portfolio}})}\right)}_{\text{Proportion of total portfolio costs respresented by project "i"}} \times \\ \underbrace{\left(\dfrac{\text{NPV}(\text{Cash\_Out}_j)}{\text{NPV}(\text{Cash\_Out}_{\text{Portfolio}})}\right)}_{\text{Proportion of total portfolio costs respresented by project "j"}} \times \\ \underbrace{\text{Correlation}_{i,j} \times \text{Assurance\_Score}_i \times \text{Assurance\_Score}_j}_{\text{Weighted Covariance of Project "i" to Project "j"=W\_Cov}_{i,j}} \end{pmatrix}$$

In alternative embodiments, this relationship covariance 351 could merely be any subjective determination and not an actual calculation, or the calculation might include additional variables or be defined in some other way that creates a meaningful relationship covariance for the projects 344.

Calculate Weighted Risk [Refs. 352-353]

The risk of each of the projects within the portfolio weighted by the net present value (NPV) of their cash flows (or costs) is the Weighted Risk 353. This calculation is made by summing, for each individual project within a portfolio, the risk of the project (current assurance score for the project multiplied by the intrinsic risk profile of the underlying project type) multiplied by the ratio of the NPV of the cash flows (or NPV of the costs if cash flows unavailable for even one project within the portfolio) to the total NPV of all cash flows (or NPV of all costs if cash flows unavailable for even one project within the portfolio).

$$\text{Weighted\_Risk}_{\text{Portfolio}} = \sum_{i=\text{Projects}=1}^{N=\text{Count}(\text{Projects})} \dfrac{\text{NPV}(\text{Cash\_Out}_i) \times \left(\text{Assurance\_Score}_i \times \text{Risk\_Profile}_{\text{Project\_Type}_i}\right)}{\text{NPV}(\text{Cash\_Out}_N)}$$

In alternative embodiments, this weighted risk 353 could merely be any subjective determination and not an actual calculation, or the calculation might include additional variables or be defined in some other way that creates a meaningful weighted risk for the projects 344.

Apply Relationships and Weighted Risk to Portfolios [Refs. 354-355]

With the weighted risk 353 and the relationship covariance 351 for every relationship between two distinct projects in the portfolio, this exemplary embodiment of the investment is able to calculate the portfolio risk 355 as the square root of the sum of squared weighted risk for each project in the portfolio and the relationship covariance for each pair of distinct projects in the portfolio.

$$\text{Portfolio\_Risk}_{\text{Portfolio}} = \sqrt{(\text{Weighted\_Risk}_{\text{Portfolio}})^2 + \text{Relationship\_Covariance}_{\text{Portfolio}}}$$

In alternative embodiments, this portfolio risk 355 could merely be any subjective determination and not an actual calculation, or the calculation might include additional variables or be defined in some other way that creates a meaningful portfolio risk for the portfolios 335.

Balance the Projects and Portfolios on an Ongoing Basis [Refs. 360-380]

Balancing portfolios 360 means optimizing project risks 348 and/or optimizing portfolio risks 355. Optimizing project risks can be accomplished in part through ongoing assurance review efforts that formulate delivery and value assurance plans 370 for projects 380 that encourage completion of higher value components at the earliest possible opportunity on each project. In addition, careful consideration of project relationships 350 and formulation of projects that create options or alternative investment paths for the enterprise or organization are other means for reducing project risks 348 and also portfolio risks 355.

Optimizing portfolio risks 355 is also possible through ongoing processes to identify projects that should be eliminated, adjusted, or added to the portfolio to facilitate meeting portfolio objectives 335 or enterprise or organization objectives 305 or else reduce portfolio risk 355. In this preferred embodiment, portfolio risk 355 is known and the aggregate costs, earned value, and/or cash flows 363 can be calculated by summing up to the enterprise or organization level. As a result, expected deviations in budgets, costs, earned value, and/or cash flows can be calculated 362 and used to further optimize and balance projects and portfolios on an ongoing basis.

The balancing support provided by this first embodiment reinforces existing processes around planning, performance management, and investment formulation and realignment. Performance analyses, portfolio valuations, measures of impacts against objectives, and the results of assurance processes all contribute to determining which investments need attention. Once understood, the appropriate recommendations can be developed, presented to the appropriate governance boards and then implemented for balancing portfolios and keeping them on track to meet their objectives. There is no point in adding new project investments that will only result in exceeding specific objective impact goals unless you have miraculously satisfied all other objectives or are entirely free of resource constraints.

Modeling Project Teams [FIG. 4]

In accordance with this exemplary embodiment, a fourth submethod, modeling project teams [FIG. 4], includes a series of steps that enable personnel of an enterprise or organization to; identify and define roles and related skills [Refs. 400, 405], identify human resources and assign them one or more roles 410, assign roles 405 to components to representing a non-exclusive responsibility for developing the components, modeling a baseline project roles matrix 435, determining and optimizing a project roles matrix for each project 465, calculating role utilization 470 and contribution to risk 473, and determining and optimizing project teams [Refs. 470, 480].

Identify and Define Roles and Skills [Refs. 400-405]

In accordance with a preferred embodiment of this invention, roles are defined 405 representing differentiated sets of job responsibilities with associated skills and experience requirements 405. In this preferred embodiment, that comprises identifying the roles in existence across the organization 400, focusing on those which play a part in project investments, describing the skills or range of skills 400 associated with the role, determining minimum years of training 400 and minimum hands-on usage 400 needed for a minimum level of proficiency in the skills, and a role duration 400 that indicates the length of time the role maintains its validity for a human resource after the human resource last performs the role.

As an example, a role may be defined called "Financial Analyst" and at least partially defined as follows: "The financial analyst provides expertise in obtaining and interpreting enterprise and business unit revenue and cost information." For this role, both minimum years of training and hands-on usage are set to "1" year and the role duration is set to ten years representing that an individual who serves in this capacity and meets the minimum training and hands-on usage requirements to have first established proficiency, remains qualified in the role up to ten years thereafter. Once defined, these roles and skills 405 represent objective sets of qualifications ready to be applied to the enterprise or organization.

Identify Human Resources and Assign Roles [Refs. 410-415]

In this preferred embodiment, human resources are identified 410 representing both individual candidates for participation on projects in any capacity, or individuals participating in this invention at any capacity e.g., an assurance manager. Other variables associated with these human resources comprise a variety of elements associated with personal or contact information. In alternative embodiments, access rights and privileges to related apparatus are also included as appropriate.

In this exemplary embodiment, each human resource may also be assigned one or more of the roles 405 with additional associated details of each role assignment 410 such as; actual years of training, actual hands-on usage, last usage, and behaviors. The latter variable of a role assignment, behaviors, comprises predetermined personality types of the human resource when performing in that role assignment. It is an additional and optional variable to use in optimizing project teams. Examples of values for behaviors include "driver," "analytic," "amiable," or "expressive."

Any number of choices for the behaviors is contemplated by this invention. In a preferred embodiment, the choice of behaviors would reflect a range of personality types having mainstream credibility and which do not automatically infer either a positive or negative attribute on the human resource to which it is applied. Alternative embodiments might use Myers-Briggs for example.

Create Baseline Project Roles Matrix [Refs. 150, 420-435]

In accordance with this preferred embodiment, each of the components is assigned a single role 430 representing a non-exclusive responsibility of that role to building or bringing about that component. As one skilled in the art of managing projects will appreciate, a given human resource may be qualified and needed to develop a component that is not directly applicable to their particular role assignment on the project. However, having one role associated with a component facilitates evaluations and assessments involving productivity, costs, performance, etc. that would not otherwise be readily accomplished.

In this preferred embodiment, a project inherits all the components associated with its assigned project type. When each of these components also features a component role assignment 430, a list of the distinct roles required to execute effectively on the project investment can be created 435. This list, called a baseline project roles matrix 435 is even more valuable if grouped into meaningful categories such as by scope dimensions.

Develop Project Roles Matrix [Refs. 380, 440-465]

With the baseline project roles matrix 435 serving as a guide, and a resource pool 415 either in total or reduced to a list of those human resources having at least one of the role assignments specified in the baseline project roles matrix, a project team, represented by a project roles matrix 465 can be defined based on teaming criteria 440 and availability 450 of the candidate team members.

The teaming criteria 440 may comprise specifying desired levels of experience, and/or combinations of behaviors. As an example, an enterprise or organization may find that project teams based in New York City are more effective and productive when they consist of a predominance of members in key roles having the behavior of "driver" whereas project teams in St. Louis are more effective with a relative scarcity of "drivers" in key roles. Such subtleties of teaming criteria are best acquired through experience and consideration of past performance as well as proper consideration of related laws and statutes.

In this preferred embodiment, the invention focuses on more objective teaming criteria. Alternative embodiments also contemplate teaming criteria that allow for selection of specific individuals based on subjective associations, past performance on teams, resource costs, affiliations with a specific subgroup of an enterprise or organization, etc.

Calculate Role Utilization [Ref. 470]

Role utilization is a function of the level under consideration e.g., Project, Portfolio, or Enterprise or Organization. At a project level, the utilization of a specific role depends on the proportion of components of the project having their role assignment as that specific role versus the total number of role assignments. It is a relative measure of the amount of work i.e., number of components to build or bring about, that the specific role is responsible for relative to all the other roles having a part in bringing the project's components into existence. The equation follows.

$$\text{Role\_Utilization}_{Role)}(\text{Level} \in (\text{Project, Portfolio, Enterprise})) = $$

$$\frac{\sum_{Component_{Level}=1}^{N=Count(Component_{Level})} \text{Role\_Assignement}_{Role}}{\text{Count}(\text{Role\_Assignment}_{AllRoles\ in\ Level})}$$

$$(\text{Component}_{Level}) \equiv \text{True}$$

In alternative embodiments, this role utilization calculation 470 could merely be any subjective determination and not an actual calculation, or the calculation might include additional variables or be defined in some other way that creates a meaningful role utilization 470.

Calculate Contribution to Risk [Ref. 473]

Contribution to risk 473 is a function of the level under consideration e.g., Project, Portfolio, or, Enterprise or Organization. At a project level, the contribution to risk 473 of a specific role depends on the proportional value and complexity of the components of the project having their role assignment as that specific role versus the total value and complexity of components across all role assignments. It represents a measure of the percentage of components completed i.e., deemed to exist, by that role relative to the amount still to be completed by that specific role, in relation to all the other roles responsible for their components. The equation follows.

$$\text{Contribution\_to\_Risk}_{Role}(\text{Level} \in (\text{Project, Portfolio, Enterprise})) = \frac{\left( \sum_{C=Component_{(Role\_Assignment=Role)}}^{Count(Component_{(Role\_Assignment=Role)})} (\text{Value}_c) + (\text{Complexity}_c) \right)}{\sum_{r=Component_{(All\ Roles\ in\ Level)}}^{Count(Component_{(All\ Roles\ in\ Level)})} (\text{Value}_r) + (\text{Complexity}_r)}$$

Role_Utilization

In alternative embodiments, this contribution to risk calculation 473 could merely be any subjective determination and not an actual calculation, or the calculation might include additional variables or be defined in some other way that creates a meaningful contribution to risk 473.

Optimize Project Teams [Refs. 477-480]

Once a project roles matrix 465 has been established for a project, this project roles matrix can evolve 477 with the project. Adjustments to project teams 480 may be necessary to; a) keep pace with changes in underlying project variables such as important dates, b) respond to collaborative or conflict areas arising from a determination of project relationships 350 affecting the project, c) respond to a disruption arising from one or more team members, d) respond to overall balancing recommendations 360, or e) respond to recommendations arising from efforts 370 to minimize project risk 348 or portfolio risk 355.

Apparatus [FIG. 5]

In accordance with this exemplary embodiment, an apparatus [FIG. 5], provides a series of system elements that in combination enable personnel of an enterprise or organization to manage all the data and information associated with enterprise investment delivery and value assurance and comprises; a communications network 500, a data server and analytics engine 510, an application server/database gateway 520, a web server 530, users [Refs. 540, 550], a storage network architecture (SNA) 560. The storage network architecture 560 further comprising; investment data 561, analytic views 562, and web services elements 563.

As part of this patent application, two identical copies of a disc are included. Each disc contains a working embodiment of this apparatus and associated installation and guidance notes (Use Serial No. 8225-7106-2291-2188-1420). This working embodiment comprises; the computer program (named 9Dimensions®) which is a client/server enterprise application built with Microsoft Visual Studio and, Microsoft's Database Engine (MSDE2000) as the underlying database and database management system. The computer program contained on each identical disc can be executed on Windows 2000, Windows NT, or higher. The analytic views and reports created by the computer program are written i.e., published, to any HTML-compliant server or machine (e.g., Windows, Unix, Linux, etc.) and can be viewed with any browser that has a SVG (Scalar Vector Graphics) plugin installed. The browser for the computer program as embodied on the disc requires Internet Explorer browser (v. 5.0 or higher). To install the computer program provided, the installer must have Administrator's access rights for the target hardware, knowledge of MS Windows services and security, as well as MS SQL Server 7.0/MSDE2000.

Apparatus Alternative Embodiments—Overview

The apparatus in a preferred embodiment may be implemented in hardware and/or software, so the apparatus may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention.

Apparatus Alternative Embodiments—Operating Systems

As those skilled in the art will appreciate, a user computer will typically include an operating system (e.g., Windows NT, 95/98/2000, Linux, Solaris, etc.) as well as various conventional support software and drivers typically associated with computers. User computer can be in a home or business environment with access to a network. In an exemplary embodiment, access is through the Internet through a commercially available web-browser software package.

Apparatus Alternative Embodiments—Communication

Communication between users [Refs. 540, 550] and the apparatus of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Apparatus Alternative Embodiments—Databases

The databases [Refs. 561,562] may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft SQL Server by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Apparatus Alternative Embodiments—Interface and Access

The computer [Refs. 540,550] may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access Sequel Server, Oracle, MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code in C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

Apparatus Alternative Embodiments—Networks and Protocols

It will be appreciated, that many applications of the present invention could be formulated. One skilled in the art will appreciate that the network 500 may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network 500. The network may be a public network and assumed to be insecure and open to eavesdroppers. In the illustrated implementation, the network may be embodied as the Internet. In this context, the computers may or may not be connected to the Internet at all times. For instance, one computer may employ a modem to occasionally connect to the Internet, whereas another computer might maintain a permanent connection to the Internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The apparatus may be suitably coupled to network via data links 510. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Such communication methods are well known in the art, and are covered in a variety of standard texts. See, e.g., GILBERT HELD, UNDERSTANDING DATA COMMUNICATIONS (1996), hereby incorporated by reference.

It should be appreciated that the particular implementations shown and described herein are illustrative of the invention and its first mode and are not intended to otherwise limit the scope of the present invention in any way. Indeed, for the sake of brevity, conventional data networking, application development and other functional aspects of the apparatus (and elements of the individual operating components of the apparatus) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical apparatus.

Apparatus Alternative Embodiments—Conclusion, Ramifications, and Scope

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware.

Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to flowchart and structural illustrations of methods, apparatus (e.g., systems), and computer program products according to various aspects of the invention. It will be understood that each functional area of the flowcharts and illustrations, and combinations of functional areas respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowcharts and structural illustrations.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional areas of the flowcharts and structural illustrations support combinations of means for performing the specified functions, combinations of steps for performing the specified functions, and program instruction means for performing the specified functions. It will also be understood that each functional area, and combinations of functional areas, can be implemented by either special purpose hardware-based computer systems which perform the specified functions or steps, or suitable combinations of special purpose hardware and computer instructions.

CONCLUSION, RAMIFICATIONS, AND SCOPE

This invention describes a method and submethods with an apparatus of computer-assisted application structure for the calculation, presentation and interpretation of information for enterprise investment delivery and value assurance. The invention addresses the need to provide a dynamic and responsive environment to establish investment structures and business objectives, define baseline investment competencies and variables, and to consistently, systematically, and objectively apply those rules and variables through an ongoing, observation-based process for tracking, managing, and balancing business investment risks, relationships and returns.

This invention uniquely addresses these requirements by providing a source whereby business professionals (without programming or software expertise) can define enterprise risk profile(s) across scope dimensions, weigh those existing capabilities according to perceived impact on meeting overall enterprise goals and objectives, define the range of investment asset types and their related components, and establish the enterprise investment hierarchy.

This invention uses the framework and rule-based reference system for calculations and pictorial and diagrammatical renderings about the health, status, and range of predicted outcomes of pending or in progress investments. These are stored in a complex application and reporting program not directly accessible by a business professional unless they have extensive software or programming expertise.

This invention is valuable in any enterprise or organization that subscribes to the Six Sigma methodology for "defect reduction." Six Sigma facilitates fact-based, quantifiable insistence on continuous improvement and a dogged commitment to rooting out and improving defects in processes. This invention is an example of a means for supporting Six Sigma principles comprising; use of data and systems, setting improvement goals, taking a team approach, involving employees, and defining roles, all for investments in projects. For further information regarding Six Sigma, see, for example, LARSON ALAN, DEMYSTIFYING SIX SIGMA: A COMPANY-WIDE APPROACH TO CONTINUOUS IMPROVEMENT (2003); this text is hereby incorporated by reference.

This invention is also valuable as an adjunct to outsourcing service level agreements (SLA) as a means to manage their delivery and value. SLA management is typically about tracking performance against predefined targets but it usually also covers contract management, payment and incentive management to enable a company and outsourcer to transact fees. This invention supports that effort by helping to manage the delivery and value of the underlying investments thereby easing the SLA management process and ultimately adding value to both the client and the outsourcer. For further information regarding SLAs, see, for example, STURM, RICK AND MORRIS, WILLIAM, FOUNDATIONS OF SERVICE LEVEL MANAGEMENT (2000) or BERGERON, BRYAN, ESSENTIALS OF SHARED SERVICES (2002); these texts are hereby incorporated by reference.

In the foregoing specifications, the invention has been described with reference to specific embodiments. However, it will be appreciated that various modifications and changes can be made without departing from the scope of the present invention. The specification, associated computer program, and figures are to be regarded in an illustrative manner, rather than a restrictive one, and all such modifications are intended to be included within the scope of present invention. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes", "comprising", or any other variation thereof, are intended to cover a non-exclusive inclusion, such that a process, method, article, or apparatus that includes a list of elements does not include only those elements but may include other elements not expressly listed or inherent to such process, method, article, or apparatus.

We claim:

1. A computer-implemented method for modeling an objective delivery and value assurance risk that a project grouping will meet one or more business objectives, the method comprising:
    receiving a selection, by an application server, of a plurality of projects, the selected plurality of projects being added to a project grouping, each project in the project grouping relating to the one or more business objectives and each project having a project type, the project grouping containing at least two projects with different project types, the project grouping being stored in a database, and the selection being received from a web server in communication with the application server;
    providing, by the application server to one or more client devices, a template for each project in the project grouping, each template including a list of components associated with the project type of the project and further including at least one deliverable associated with each component in the list, and for each deliverable including at least one necessary role or skill, the components in the list being retrieved from the database by a data server and passed to the application server by the data server;
    receiving, by the application server from one or more client devices, for each project in the project grouping, an assurance review including binary values that indicate whether or not each component in the list of components included in the template for the project exists;
    determining, by the application server, for each project in the project grouping, utilizing the components in the list of components included in the template for the project, a baseline roles and skills matrix;
    determining, by the application server, for each project in the project grouping, an assurance score based on the binary values in the received assurance review;
    determining, by the application server, for each project in the project grouping, a delivery and value assurance risk value based on the determined assurance score and risk profile for the project type, the determined delivery and value assurance risk value being stored in the database;
    determining, by the application server, weighted co-variances between each project in the project grouping and each of the other projects in the project grouping based on the determined delivery and value assurance risk value for each project in the project grouping, further based on correlations quantified between each project in the project grouping and every other project in the project grouping, and further based upon a proportional cost for each project in the project grouping, the proportional cost representing a cost of each project in the project grouping divided by a total cost of all the projects in the project grouping, the determined delivery and value assurance scores for each project, the correlations quantified between each project in the project grouping, and the proportional cost each being retrieved from the database by the data server and passed to the application server by the data server;
    determining, by the application server, a relationship co-variance value for each distinct pair of projects in the project grouping based on the determined weighted co-variances of each distinct pair of projects and based on an extent to which each distinct pair of projects relates to the one or more business objectives of the project grouping;
    determining, by the application server, for each project in the project grouping, a weighted delivery and value assurance risk based on the determined delivery and value assurance risk of each project in the project grouping and a size of each project in the project grouping relative to the entire project grouping, the determined delivery and value assurance risk of each project in the project grouping and the size of each project in the project grouping being both retrieved from the database and passed to the application server by the data server;
    determining, by the application server, for each project in the project grouping, roles and skills utilization, contributions to risk by roles and skills, and roles and skills deficiencies;
    providing, by the application server, to at least one client device of the one or more client devices, a visualization of a model displayable on the at least one client device; and
    outputting, by the application server via the visualization of the model, a predicted delivery and value assurance risk of the project grouping meeting the business objectives, the predicted delivery and value assurance risk for the project grouping in the visualization of the model being adjustable based on changes in subsequent assurance reviews and/or based upon changes in the baseline skills and roles matrix, the predicted delivery and value assurance risk of the project grouping meeting the business objectives being determined by the model based on the weighted risk of each project in the project grouping and the relationship co-variances of each distinct pair of projects in the project grouping.

2. The method of claim 1, wherein at least one of the relationship co-variance values is bi-directionally asymmetric or symmetric.

3. The method of claim 1, wherein at least one of the components includes at least one variable selected from the group consisting of duration, complexity, value, retention, and role assignment.

4. The method of claim 3, wherein the duration is a measure of the length of time the at least one of the components remains valid at marginally reducing project risk and, upon expiration of the duration, marginal project risk is reinstated.

5. The method of claim 1, wherein the weighted co-variances between each project in the project grouping and each of the other projects in the project grouping and the weighted delivery and value assurance risk for the project grouping are weighted further based on at least one of cash flow, cost, or earned value attributable to each project relative to that attributable to the project grouping.

6. The method of claim 1, wherein each of the components includes at least one of work product, event, minimum viable feature, and milestone.

7. A system for modeling an objective delivery and value assurance risk that a project grouping will meet one or more business objectives comprising:
   (a) a data server in communication with a database;
   (b) a web server;
   (c) one or more client devices;
   (d) a communications network in communication with the data server, the web server, an application server and one or more client devices; and
   (e) the application server having a processor and a memory that includes instructions that, when executed by the processor, cause the processor to model an objective delivery and value assurance risk that a project grouping will meet one or more business objectives by:
      receiving a selection, by the application server, of a plurality of projects, the selected plurality of projects being added to a project grouping, each project in the project grouping relating to the one or more business objectives and each project having a project type, the project grouping containing at least two projects with different project types, the project grouping being stored in a database, and the selection being received from a web server in communication with the application server via the communications network;
      providing, by the application server to one or more client devices via the communications network, a template for each project in the project grouping, each template including a list of components associated with the project type of the project and further including at least one deliverable associated with each component in the list, and for each deliverable including at least one necessary role or skill, the components in the list being retrieved from the database by a data server and passed to the application server by the data server via the communications network;
      receiving, by the application server from one or more client devices via the communications network, for each project in the project grouping, an assurance review including binary values that indicate whether or not each component in the list of components included in the template for the project exists;
      determining, by the application server, for each project in the project grouping, utilizing the components in the list of components included in the template for the project, a baseline roles and skills matrix;
      determining, by the application server, for each project in the project grouping, an assurance score based on the binary values in the received assurance review;
      determining, by the application server, for each project in the project grouping, a delivery and value assurance risk value based on the determined assurance score and risk profile for the project type, the determined delivery and value assurance risk value being stored in the database;
      determining, by the application server, weighted co-variances between each project in the project grouping and each of the other projects in the project grouping based on the determined delivery and value assurance risk value for each project in the project grouping, further based on correlations quantified between each project in the project grouping and every other project in the project grouping, and further based upon a proportional cost for each project in the project grouping, the proportional cost representing a cost of each project in the project grouping divided by a total cost of all the projects in the project grouping, the determined delivery and value assurance scores for each project, the correlations quantified between each project in the project grouping, and the proportional cost each being retrieved from the database by the data server and passed to the application server by the data server;
      determining, by the application server, a relationship co-variance value for each distinct pair of projects in the project grouping based on the determined weighted co-variances of each distinct pair of projects and based on an extent to which each distinct pair of projects relates to the one or more business objectives of the project grouping;
      determining, by the application server, for each project in the project grouping, a weighted delivery and value assurance risk based on the determined delivery and value assurance risk of each project in the project grouping and a size of each project in the project grouping relative to the entire project grouping, the determined delivery and value assurance risk of each project in the project grouping and the size of each project in the project grouping being both retrieved from the database and passed to the application server by the data server;
      determining, by the application server, for each project in the project grouping, roles and skills utilization, contributions to risk by roles and skills, and roles and skills deficiencies;
      providing, by the application server, to at least one client device of the one or more client devices via the communications network, a visualization of a model displayable on the at least one client device; and
      outputting, by the application server via the visualization of the model, a predicted delivery and value assurance risk of the project grouping meeting the business objectives, the predicted delivery and value assurance risk for the project grouping in the visualization of the model being adjustable based on changes in subsequent assurance reviews and/or based upon changes in the baseline skills and roles matrix, the predicted delivery and value assurance risk of the project grouping meeting the business objectives being determined by the model based on the weighted risk of each project in the project grouping and the relationship co-variances of each distinct pair of projects in the project grouping.

8. The system of claim 7, wherein at least one of the relationship co-variance values is bi-directionally asymmetric or symmetric.

9. The system of claim 7, wherein at least one of the components includes at least one variable selected from the group consisting of duration, complexity, value, retention, and role assignment.

10. The system of claim 9, wherein the duration is a measure of the length of time the at least one of the components remains valid at marginally reducing project risk and, upon expiration of the duration, marginal project risk is reinstated.

11. The system of claim 7, wherein the weighted covariances between each project in the project grouping and each of the other projects in the project grouping and the weighted delivery and value assurance risk for the project grouping are weighted further based on at least one of cash flow, cost, or earned value attributable to each project relative to that attributable to the project grouping.

12. The system of claim 7, wherein each of the components includes at least one of work product, event, minimum viable feature, and milestone.

\* \* \* \* \*